United States Patent [19]

Benuzzi

[11] Patent Number: 4,576,536
[45] Date of Patent: Mar. 18, 1986

[54] MACHINE FOR STACKING AUTOMATICALLY PACKS OF PANELS OF DIFFERENT SIZES ON RESPECTIVE LIFTING PLATFORMS

[75] Inventor: Gino Benuzzi, Bologna, Italy

[73] Assignee: Giben Impianti S.p.A., Pianoro, Italy

[21] Appl. No.: 506,939

[22] Filed: Jun. 22, 1983

[30] Foreign Application Priority Data

Jun. 24, 1982 [IT] Italy ................... 3461 A/82

[51] Int. Cl.⁴ .................. B65H 31/24; B65H 35/00
[52] U.S. Cl. ........................ 414/51; 198/372;
198/412; 198/457; 198/740
[58] Field of Search ............ 414/51, 52; 198/370,
198/372, 412, 457, 486, 488, 740, 358, 436, 487

[56] References Cited

U.S. PATENT DOCUMENTS 2,933,207 4/1960 Edmonds et al. ................. 414/52
3,084,812 4/1963 Johansson .................... 414/52 X
4,018,351 4/1977 Stobb .......................... 198/436 X
4,367,999 1/1983 Benuzzi ......................... 414/51
4,403,899 9/1983 Lampe et al. .................. 414/51 X

FOREIGN PATENT DOCUMENTS

0683167 6/1930 France ......................... 198/436

Primary Examiner—Leslie J. Paperner
Assistant Examiner—Lyle Kim

[57] ABSTRACT

Panel packs, made available cyclically at the outlet of a dividing machine and arranged side by side, are transferred to a station from which they are discharged simultaneously, either into a conventional stacking unit of the wedge and lifting platform type, or, after a 90° rotation, into a composite transport runway where the packs are arranged either side by side or in sequence. Laterally of the runway are parallel rows of lifting platforms on which are stacked the packs of panels coming from the transport runway, so that panels of the same size will be stacked on each platform. Finally, the stacks of panels are discharged from the various lifting platforms and transferred to conveyors and sorters.

20 Claims, 18 Drawing Figures

Fig. 14

# MACHINE FOR STACKING AUTOMATICALLY PACKS OF PANELS OF DIFFERENT SIZES ON RESPECTIVE LIFTING PLATFORMS

FIELD OF THE INVENTION

This invention relates to a machine for stacking automatically, on respective lifting platforms, panels or packs of panels of different sizes coming in any succession from a dividing machine or any other type of machine. The main object of the invention is to enable the formation of a stack of panels of the same size on each lifting platform, so as to simplify the successive discharge and sorting of said stacks of panels, which is particularly important, for example, when said stacks are then to be strapped. The features of this machine and the advantages resulting therefrom will be apparent from the following description of the preferred embodiment thereof, given by way of example, with reference to the accompanying drawings, wherein:

DESCRIPTION OF THE PREFERRED EMBODIMENT

Figure 1:
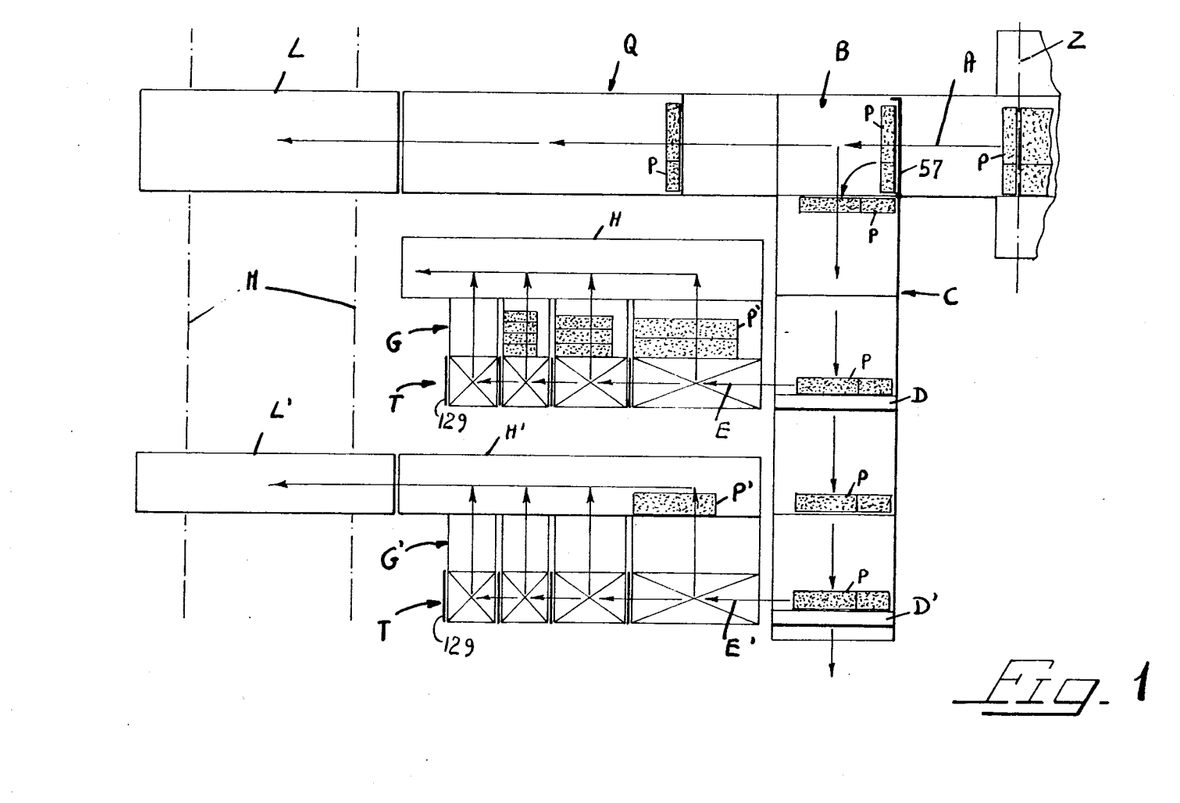
FIG. 1 is a diagrammatic plan view of the machine according to the invention.

In FIG. 1, Z indicates the last cutting line of a dividing machine wherefrom packs P of panels arranged side by side will be discharged cyclically to be stacked automatically onto respective lifting platforms T of suitable dimensions, so that packs of the same size will be stacked on each platform. The packs of panels arriving cyclically downstream of the cutting line Z, are transferred by a removing means shown by the arrow A, to a switching station B. At this station, the packs of panels to be stacked on the lifting platforms T are, if desired, rotated together by 90° and are then transferred onto a composite transport runway line C whereon the packs still may be disposed side by side if they have been rotated as above, or they may be disposed in sequence. The platforms T are arranged in linear groups formed by a suitable number of rows at right angles to the transport line C. On the latter, in register with said groups of platforms, transfer units D and D' are arranged to stop the packs of panels and transfer them, one by one and suitably spaced from each other, to sorting and stacking means, symbolically shown by the arrows E, E', which will stack said packs on the desired platform or platforms T. Finally, the stacks P' of panels formed on the lifting platforms T can be discharged from the latter and either accumulated side by side on successive dwell stations G—G' or transferred immediately onto powered roller assemblies H—H' which, for example, will feed said stacks to sorting carriages L—L' movable on a rail M.

In order to improve the operation of the subject machine, the packs of panels reaching the switching station B can be transferred, without undergoing any rotation, to a conventional device Q comprising a wedge and an underlying lifting platform whereon a plurality of packs of panels can be formed and arranged side by side as desired. The lifting platform of the device Q is in line with the discharge end of the roller assemblies H—H' and, therefore, can be served by said discharging and sorting carriages L—L'.

The removing unit A for transferring the packs P of panels to the switching station B will be now described with reference to FIG. 2. In this Figure, R indicates a pressure bar which is usually associated with the dividing machine, and S indicates a part of the frame of said unit. Arranged immediately downstream of the dividing machine, as a co-planar substantial extension of the working plane thereof, is a sliding surface U of such dimensions as to accommodate the packs of panels. The surface U is formed by the planar upper surface, optionally coated with a suitable material to avoid scratching the panels and help in sliding said panels, of a plurality of beams 1 of any suitable section, parallel to each other and equally spaced apart, at right angles to the cutting line Z. Said beams are secured at their ends to transoms 2, 3 which are fixed to a frame 4 which is located parallelly and at a suitable distance below the grid-like frame formed by said beams 1. The frame 4 is transversely pivoted at 5 at the rear end thereof to support members 6' (see also FIG. 3) of a structure 6 which is secured to the ground and is provided with support members 6" capable of supporting fluid-operated jacks 7 the plungers or rods of which are pivoted at 8 to said frame 4. By virtue of said jacks 7, the assembly 4-3-2-1 can be moved from the normal working position shown with full lines in FIG. 2 to the dot-and-dash position wherein the front end of said assembly is directed upwards so as to form, immediately downstream of the cutting line Z an opening of such a width as to permit the cut-offs, resulting from the cutting operation on each large pack of panels originating said packs P, to be discharged. A conveyor 9, parallel to the cutting line Z, may be provided between the frame S and the front end of the structure 6, to collect said cut-offs and convey them out of the machine to suitable collection and disposal means.

The sides of the frame 4 are provided with longitudinal guides 10 whereon a carriage 12 is moved on wheels 11, the side walls of said carriage being interconnected by transoms 12'—12'' located above and below the frame 4. The carriage 12 is moved reciprocatingly and variously by a motor-reducer 13 mounted on the frame 4 and the output shaft of which carries a crank 14 which is connected to the carriage 12 through a connecting rod 15. The members 14 and 15 move in the space between the frame 4 and the grid-like frame formed by the beams 1. Secured to the upper transom 12'' of the carriage 12 is the lower wing of a hinge 16 having a pivot axis 17 which is parallel to the line of cut Z. The upper wing of the hinge 16 has secured thereto similarly-shaped teeth 18 moving loosely in the spaces between the beams 1 and having co-planar ends 18' coated with such a material as to avoid marring the panels. The carriage 12 has associated therewith any suitable means whereby said teeth 18 will be moved to bring the ends 18' thereof either below the sliding surface U or suitably protruding upwardly therefrom. Said means may comprise, for example, small rollers 19 mounted at the front side of the upper wing of the hinge 16 and cooperating with inclined runways 20 supported by guides secured to the lower wing of said hinge, and actuated by jacks 21. Secured to the sides of the carriage 12 are opposed uprights 22 supporting—above the surface U, transversely and at a suitable distance with respect thereto—a beam 23 realizing a portal-like structure, on which are mounted pneumatic jacks 24 the rods of which are directed downwards. There is one jack for each tooth 18, and each jack is in register with a tooth end 18'. A pad 25 is associated with the rod of each jack 24 and is preferably coated with such a material as to avoid marring the panels. Fixed to the beam 23, at the ends thereof, are two side members 26 directed away from the dividing machine and interconnected, if desired, by a transverse member 27 and adapted to support the pivot 28 of a paddle 29 which, by any suitable means, can be moved and held either in the full-line position (FIG. 2) to sweep the surface U longitudinally, or in the rest (dotted line) position raised from the surface U. The distance V from the paddle 29, when in its active position, to the imaginary plane comprising the axes of the jacks 24 is suitably smaller than the diameter V' of the imaginary circumference drawn by the crankpin 15' of said crank 15. The means moving the paddle 29 comprises two toggles 30 each connected to a side edge of the paddle and to a respective side member 26, and actuated by a respective jack 31. The operation of this machine is now apparent. When the dividing machine is about to complete its operative cycle, the device is in the stand-by position shown in FIG. 2, but with all jacks in their retracted position, all teeth 18 in their lowered position and paddle 29 in its raised position. On completion of the cutting operation and with the presser R in its raised position, the teeth 18 are raised and the rods of the jacks 24 are extended so that the packs of panels coming from the dividing machine will be clamped from above and from below by the members 18' and 25, respectively. Preferably, the jacks 24 are controlled selectively depending upon the transverse dimensions of the packs P, whereby the jacks with no portion of panel therebelow will not be actuated. When the packs P have been clamped, the motor-reducer 13 is actuated and, therefore, the carriage 12 effects its active stroke, leftwards as seen in FIG. 2. When the crank 14 has moved half a rotation, the packs P have moved, at decreasing speed, to the position P'''. A sensor which detects said position then causes the jacks 24 to be deactivated and the teeth 18 to be lowered, whereby the carriage 12 is returned to its original position, whereupon the paddle 29 is lowered and said carriage is caused to effect a complete reciprocation, so that said paddle 29 moves the pack of panels from the position P''' to the position P'''', wherefrom it will be removed by means pertaining to the station B, to be described hereinafter. Obviously, during the return stroke of the carriage 12, the paddle 29 will be raised.

The switching station B to which the packs of panels P are cyclically transferred by said remover-pusher device will now be described with reference to FIGS. 3, 4 and 5. Said station comprises a rectangular bed 32 resting on the floor through a base 33 and having affixed thereto, parallelly to the cutting line Z and suitably inter-spaced, a plurality of profiles 34 surmounted longitudinally by profiles 35 having an isosceles trapezoid configuration. The latter profiles, optionally coated with a suitable material, will constitute the grid-like surface whereon the packs of panels coming from the station B will slide. Arranged parallelly intermediate the profiles 34-35, and co-planar therewith, are U-shaped profiles 36 having rotatably mounted therein a plurality of small wheels 37 of equal diameter and suitably protruding from the top side of said profiles and supporting the upper stretch of a belt 38. Each belt 38 closes through a return stretch under the wheels 37, and after passing around an idle wheel 39, said belt cooperates with a pulley 40 keyed on a shaft 41 rotatably supported by a side member of the bed 42 whereon the profiles 36 are fixed, the bed 42 being located inside the bed 32 and with its corner regions, and being connected to the rods of the jacks 43 supported on the base structure 6-33. Keyed to the shaft 41 is a pulley 44 which is driven through a belt by a motor-reducer 45 fixed to the bed 42. By means of this driving assembly, the upper stretches of the belts 38 are moved to the transport line C (FIG. 1). By means of said jacks 43, said belts 38 may be held below the plane defined by the profiles 35, or they may be raised to protrude suitably from said plane to transfer the packs of panels to the transport line mentioned above.

Figure 2:
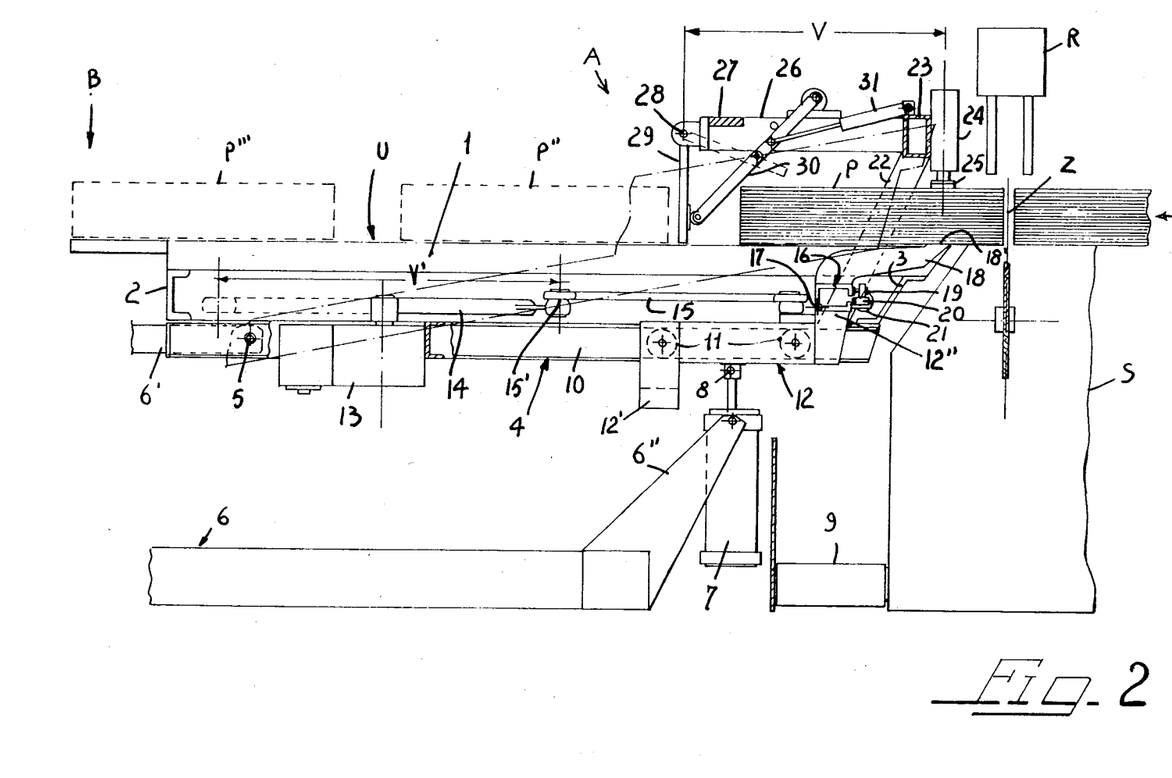
FIG. 2 is a partly sectional view of the device for cyclically removing the packs of panels from the cutting line.
Figure 3:
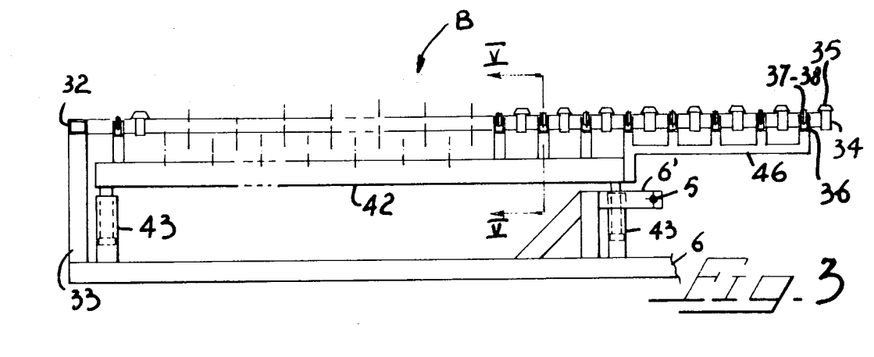
FIGS. 3 and 4 are a longitudinal sectional view and a plan view, respectively, of a composite sliding plane to which said packs of panels from the dividing machine are transferred cyclically.
Figure 4:
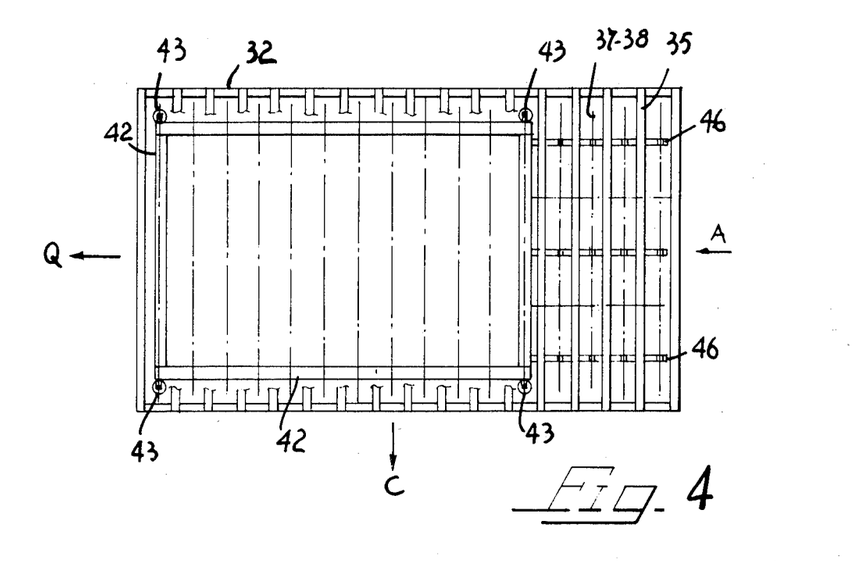
Figure 5:
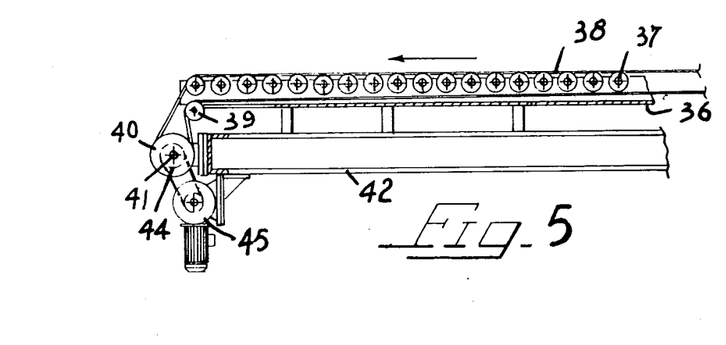
FIG. 5 is a detailed section view of the assembly along line V—V of FIG. 3.

Since the pivot 5 of the remover-pusher device, described with reference to FIG. 2, is preferably located below the surface of the station B, the ends of the beds 32 and 42 directed towards said remover-pusher device have a cantilever arrangement as shown in FIGS. 3 and 4, wherein the numeral 46 indicates comb-like members integral with the bed 42 and supporting some of the profiles 36 carrying the power-driven belts 38.

Figure 6:
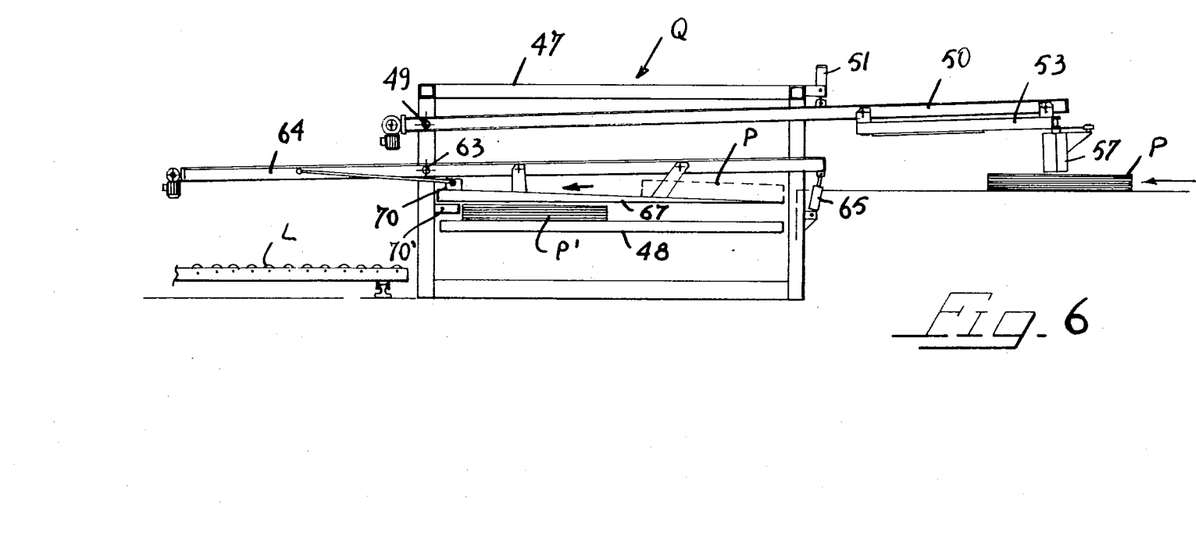
FIGS. 6 and 7 are side views, partly in section, in different operating conditions, of a conventional stacking machine of the wedge and lifting platform type associated with a translating or rotating device for the packs of panels.
Figure 6A:
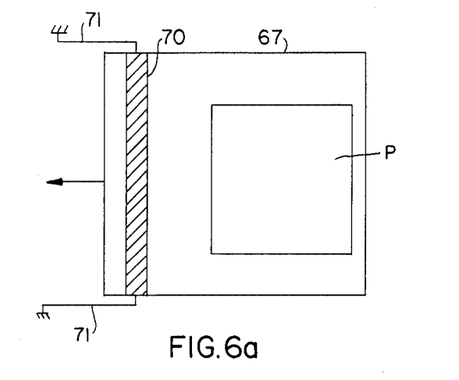
FIGS. 6a, 6b and 6c are plan views corresponding to portions of FIGS. 6 and 7, showing the location and configuration of the transverse abutment bar.
Figure 6B:
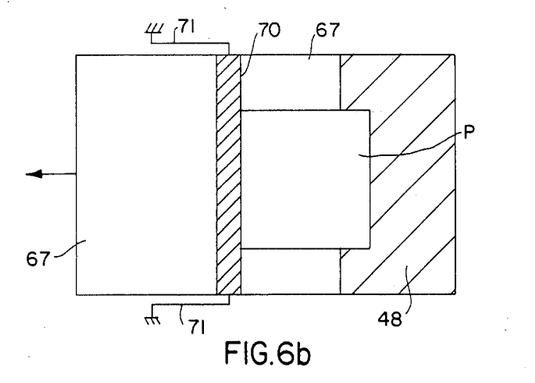
Figure 6C:
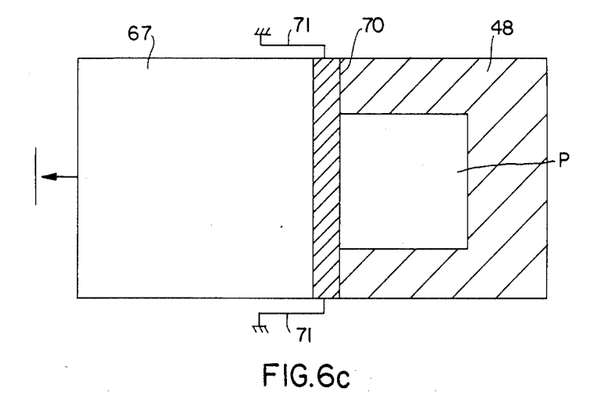

With reference to FIGS. 6, 7, 8 and 9, the other components of the switching station B, and the conventional stacking machine Q of FIG. 1, will be described. In FIG. 6, the numeral 47 indicates a portion of the frame supporting a conventional lifting platform comprising a horizontal movable plane 48 designed to collect the packs of panels to be stacked at the station Q of FIG. 1.

Pivoted at 49 at the upper portion of the frame 47 are a pair of guides 50 which are interconnected at the front end thereof by a transom, which are so long as to be disposed longitudinally above the station B, and which are controlled by jacks 51 associated with the frame 47 in any suitable manner. A carriage 53 connected to chains 54 passing around sprockets mounted at the ends of the guides 50 and controlled by a motor-reducer 55 moves longitudinally on said guides 50 on its own wheels 52. Pivoted at 56 on the front side of the carriage 53 directed toward the cutting line Z, at the corner of the carriage near the transport line C, is a paddle 57 which is normally disposed in a vertical position and parallel to the cutting line Z. The free end of said paddle is provided with a projection 58 so as to have an L-shape in plan view. The paddle 57 is operatively connected at 59 to the rod of a jack 60, the body of the jack 60 being connected at 61 to the carriage 53. The carriage 53 comprises suitable stiffening braces 53'. When the paddle 57 is at rest (FIGS. 8 and 9), it abuts against an external stop 62 secured to the front side of the carriage 53 and is suitably raised from the sliding plane of the station B (FIG. 6), the jacks 51 being activated to achieve this result. When the packs P of panels have been transferred to the station B, the jacks 51 are activated to lower the paddle 57 as in FIG. 7. Now, if the packs P are to be transferred to the station Q, the motor-reducer 55 is activated and the paddle 57 operates as a normal pusher. Conversely, if the packs are to be transferred to the line C with a 90° rotation, the jack 60 is activated to rotate the paddle 57 and, therefore, the row of packs P through an angle of 90° in an counter-clockwise direction when looking at FIG. 1, and as shown in dotted lines in FIG. 9. During this operation, the projection 58 at the free end of the paddle 57 engages the outer end portion of the row of packs P and keeps said packs in an appropriate position. In both cases, after the operative stroke of the paddle 57, the latter is returned to its lifted rest position.

Figure 7:
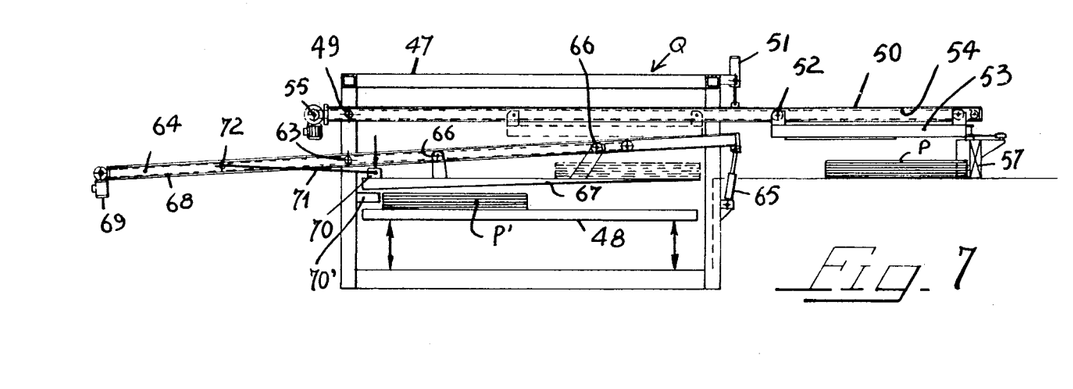
Figure 8:
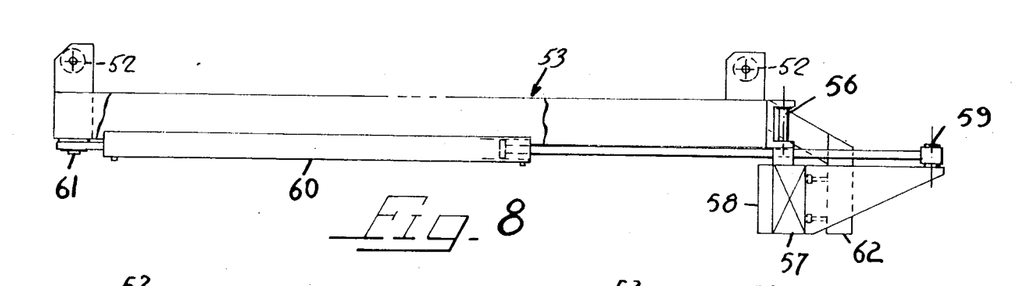
FIGS. 8 and 9 are diagrammatic side elevational and plan views, respectively, of the carriage of the translating or rotating device for the packs of panels, associated with the stacking machine of FIGS. 6 and 7.
Figure 9:
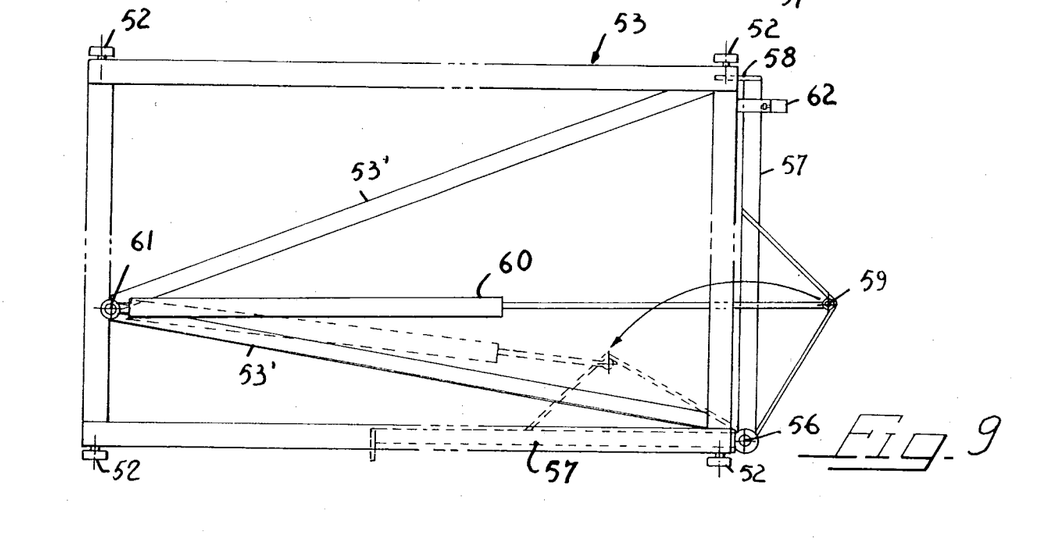
Figure 10:
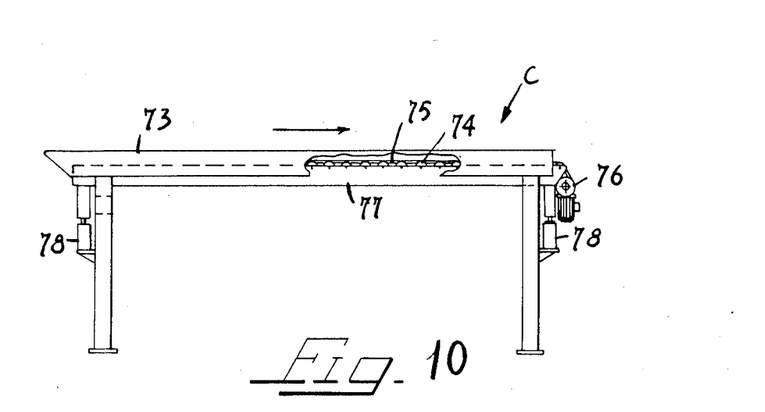
FIG. 10 is a side view, partly in section, of one of the units forming the transport runway to which the packs of panels are fed after their optional 90° rotation.

Two parallel guides 64, interconnected by a rear transom and controlled by jacks 65 connected to the frame 47, are pivoted at 63 (below the pivots 49) to the frame 47 of the lifting platform at the station Q. A wedge member 67 (constructed as a table having in transverse section the profile of the wedge) similarly to the carriage 53, is connected to chains 68 controlled by a motor-reducer 69, and can move longitudinally through its own wheels 66 on the guides 64. Resting at the rear end of the wedge member 67 is a transverse abutment bar 70 which, through suitable end links 71, is pivotably connected at 72 to said guides 68. The operation of the mechanism described above is apparent. When the packs of panels are to be stacked on the platform 48, the guides 64 are raised as shown in FIG. 7, whereby the upper surface of the wedge member 67 will be co-planar with sliding plane of the station B, to receive the packs P of panels therefrom. After the packs have reached the wedge 67, the guides 64 are lowered through the jacks 65, so that the lower surface of said wedge 67 reaches a position which is parallel and close to the top face of the pack P' of panels stacked on the platform 48, whereafter the wedge 67 is withdrawn by activating the motor-reducer 69. The blade bar 70 will skim along the surface of the wedge 67 as a result of rearward movement (to the left, as seen in FIGS. 6 and 7) of the latter, and transfer one or more packs P of panels onto the stack P'. To prevent the upper panels of the stack P' from being put out of order during this operation, the latter engage against a side stop 70' integral with the frame of the lifting platform. The platform 48 is then lowered through a distance which is the same as the thickness of the packs P which have been discharged thereon, and the wedge table 67 is moved back to its original position, whereafter the cycle is repeated. It is to be understood that before activating the wedge 67, a plurality of panels from the station B may be stacked and arranged as desired thereon. The transport runway C (FIG. 1) is formed by four identical units of the type shown in FIG. 10, arranged in sequence and in a co-planar relationship, each of which comprises a bed 73 comprising a plurality of equi-spaced profiles which are parallel to each other and to the cutting line Z, said profiles being of the same type as those (35) forming the sliding plane of the station B, and being co-planar therewith. Arranged parallelly intermediate the profiles of the bed 73 are U-shaped profiles 74 carrying longitudinal belts 75 driven by the common power unit 76, similarly to the arrangement shown in FIG. 5 with regard to the station B. The profiles 74 are mounted on a common frame 77 supported by jacks 78 connected to the bed 73, the arrangement being such that the powered belts 75 may be maintained below the bed 73 or may be selectively lifted above said bed to advance the packs of panels toward the transfer units D or D'. The transport runway C is formed by four units of the type mentioned above with reference to FIG. 10, so that two of said transport units will be arranged in front of each transfer unit D and D', so that while the one which is close to D or D' is stopped, the other unit may be left operative to receive new packs of panels from the station B and serve as a buffer unit, thus increasing the production rate of the machine.

Figure 11:
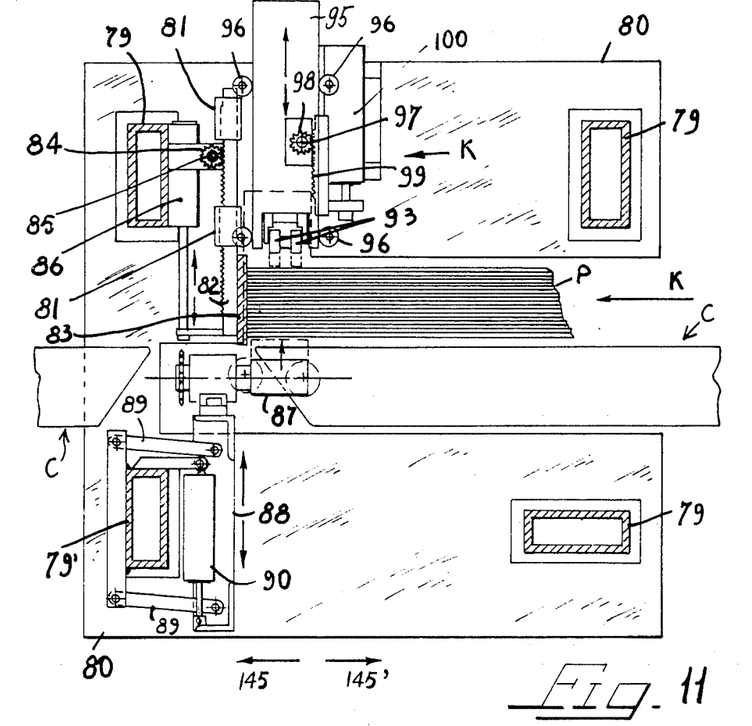
FIG. 11 is a front view, partly in section, of one of the units of the transfer means for discharging the packs of panels from the runway of the preceding Figure.
Figure 12:
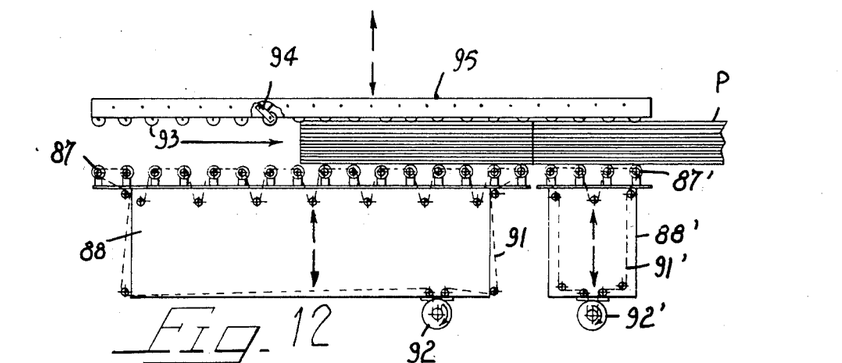
FIG. 12 is a side view, in the direction of the arrow K of FIG. 11, of the discharging unit shown therein.

With reference to FIGS. 11 and 12, one of the transfer units D or D' for discharging the packs of panels from the line transport runway C will be described. Opposite pairs of shoulders 80 are arranged at both sides of the runway C and are interconnected by transoms 79, and at least the one which is facing toward the stacking platforms T has a C-shape, as seen in FIG. 11. The shoulders 80 are supported by guides (not shown) which are parallel to the longitudinal axis of the runway C and are operatively connected to means, such as pneumatic jacks, capable of selectively displacing the assembly 79-80 on said guides (the displacement being of the order of millimeters), first away from the station B and then back to the original position, as shown in FIG. 11 by the arrows 145, 145'. Slidably supported on said shoulders 80 through supports 81 are vertical racks 82 having affixed thereto the ends of a partition 83 disposed transversely on the runway C. The racks 82 are in mesh with pinions 84 keyed to the ends of a shaft 85 parallel to 83 and rotatably supported by the shoulders 80. By the action of jacks 86, the partition 83 can be either lowered across the runway C to stop the packs P of panels, or raised therefrom to permit the packs to pass towards further manipulation. The last unit D' is also provided with a movable partition 83 to enable the disposal, from the runway C, of the cut-offs possibly resulting from the severance of the packs of panels and which cannot be discharged downstream of the cutting line Z, as described with reference to FIG. 2.

A runway of rubber-sheathed rollers 87 arranged with their axes parallel to the longitudinal axis of the runway C is provided upstream of the partition 83. As seen also in FIG. 12, the rollers 87 are supported in different numbers, as shown at 87 and 87', by respective supporting structures 88, 88' connected to the transom 79' through articulated links 89, each structure being controlled by jacks 90. Through positive drive systems 91, 91', the rollers of each group 87 and 87' are mechanically connected to each other and to the respective drive units 92, 92' provided with hydrostatic couplings. The rollers 87, 87' can rotate in the direction of the platforms T, and the rollers 87' which are in a smaller number are nearer to the row of said platforms T.

Above the rollers 87, 87' and parallel thereto, idle rollers or wheels 93 are mounted on levers 94 which are resiliently urged downwards and are connected to a presser bar 95 parallel to the partition 83. The bar 95 is guided at the ends thereof by wheels 96 supported by the shoulders 80, and it supports a longitudinally rotatable shaft 97 having pinions 98 keyed to the ends thereof and meshing with vertical racks 99 secured to the shoulders 80. A pair of jacks 100 moves the presser 95 vertically. The unit D or D' described above operates as follows. The rollers 87, 87' are normally lowered below the line of trasport C, while the presser 95 is in the maximum raised position. In the operative cycle of the transfer units D and D', the partition 83 will first be lowered to stop the packs of panels P. When suitable sensors have detected this condition, the transport unit of the runway C located in front of the partition is deactivated by lowering the belts 75 which, preferably, will continue moving, while in due time the rollers 87, 87' are raised and the presser 95 is lowered, whereby the front end of the pack or packs of panels will be raised from the sliding plane 73 and clamped between said rollers 87, 87' and the upper wheels 93. If the packs of panels are clamped while in a single row at the station D or D' after the operations mentioned above the rollers 87, 87' will be activated so that the packs of panels will be advanced in sequence towards the sorting and stacking means E and reach the latter while properly spaced apart because, as soon as a pack has left the group of rollers 87, the said group of rollers is temporarily deactivated and lowered, while the group of rollers 87' goes on operating. If the packs of panels have been transferred onto the runway C with no 90° rotation, i.e., being carried directly by wheels 37 and belts 38, and therefore have reached the units D or D' in sequence, the latter are characterized by an operation with cyclical displacement in the direction of the arrows 145, 145', whereby the packs will not contact each other. During the operation of the units D or D', the respective partition 83 may be left in its lowered position or it may be raised if desired and possible. The hydraulic couplings for the drive units 92, 92' of the rollers 87, 87' will ensure displacement of the packs with a soft start, thus maintaining the orderly assembly of the packs.

Figure 13:
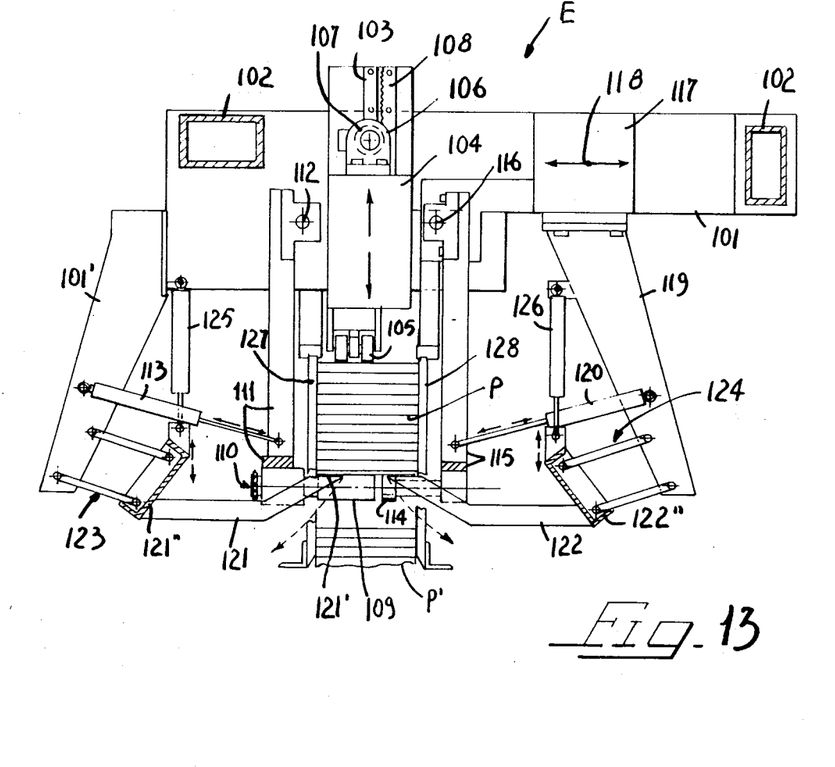
FIG. 13 is a front view, partly in section, of one of the sorting and stacking units located above the lifting platforms each designed to receive parcks of equally-sized panels.

The means E for sorting and stacking the packs T on the platforms T will now be described with reference to FIG. 13. At the upper portions of the ends of each platform T, shoulders 101 interconnected by beams 102 are interconnected by vertical guides 103 slidingly supporting the ends of a bar 104 provided at the bottom with idle and spring-loaded small wheels 105, in line with those (93) of the bar 95 of the units D and D'. The vertical movement of the bar 104 is controlled by a motor-reducer 106 which is mounted thereon and actuates the pinions 107 supported by the ends of said bar and cooperating with respective racks 108 secured to the shoulders 101. Below the wheels of the bar 104 and in line with the transport runway formed by the rollers 87, 87' when in their raised position, the invention provides a similar transport runway formed by rollers 109, also suitably sheathed, driven by suitable means 110 and supported by a structure 111 pivotably mounted on a shaft 112 which is rotatably mounted on shoulders 101 and parallel to the bar 104. Suitable jacks 113, the bodies of which are connected to a depending projection 101' of the shoulders 101 and the rods of which are connected to the ends of the structure 111, control the position of said structure and rollers 109 mounted thereon.

Axially aligned with the rollers 109 and co-planar therewith, idle sheathed rollers 114 are supported by a structure 115 also pivotably secured to a shaft 116 which is parallel to the shaft 112 but, unlike the latter, is supported by a carriage 117 capable of sliding horizontally on the shoulders 101 towards and away from the bar 104, as shown diagrammatically by the arrows 118. Means (not shown) of any type, even if not of high precision, are provided for displacing the carriage 117 to which carriage there are secured depending projections 119 capable of supporting the bodies of jacks 120, the rods of the latter being pivotably connected to the structure 115 to control the position of the latter and of respective rollers 114.

Still with reference to FIG. 13, it will be seen that just below the rollers 109, 114, and spaced apart therebetween, are the flat ends 121' and 122' of the teeth 121, 122 of respective comb-like members, each comprising a body 121", 122" supported at the ends thereof by pairs of links 123, 124 the opposite ends of which are pivotably connected to projections 101' and 119 of the shoulder 101 and carriage 117, respectively. At the same end of each body 121", 122" is connected the rod of a respective jack 125, 126 the body of which is pivotably connected to said projections 101', 119. The operation of these units is simple and apparent. When these units are about to receive the packs of panels from the units D or D', they are in the position of FIG. 13, with the rollers 109 rotating and the presser 104 lowered as permitted by the thickness of the packs P, so that the distance between the spring-loaded wheels 105 of said presser and the lower rollers 109 is suitably lower than the thickness of the packs P. Under these conditions, the packs of panels reaching the unit E, before being released from the units D or D', are clamped between the lower rollers 109, 114 and upper wheels 105 and will be advanced above the lifting platforms T while retained laterally by grid-like barriers 127 and 128 secured to the shoulders 101 and carriage 117. At the end of each platform T, as diagrammatically shown in FIG. 1, there are selectively-retractible partitions 129. Depending upon which table T the pack of the panels is loaded, the partition 129 of that platform is lowered in due time so that said partition will stop the pack from being transferred by the units E of FIG. 13. Upon occurrence of this condition, suitable sequential means stop the lower rollers 109 of the respective unit E and the jacks 113, 120 are timely retracted, whereby the rollers 109 and 114 are also retracted laterally of the pack P which, therefore, will rest on the teeth 121 and 122. In due time, the synchronous extension of jacks 125, 126 is controlled, whereby the teeth 121, 122 are lowered and protrude progressively from the guide barriers 127, 128, while the pack P is smoothly laid on the top of the stack P' of panels previously stacked on the platform T and also retained partly by said lateral barriers 127, 128. If the lifting platform T is empty, the plane thereof will be partly inserted between the grids 127, 128 so that it can receive the pack of panels as well, with no appreciable dropping effect. Thereafter, the lifting platform T on which a pack P has been discharged is lowered by an extent equal to the thickness of said pack P, and thereafter the rollers 109 and 114 as well as the teeth 121, 122 are returned to their active positions as shown in FIG. 13, said rollers 109 are rotated again and, if necessary, the previously lowered partition 129 is raised. Inasmuch as each lifting platform is provided with a unit E shown in the type of FIG. 13, with independent controls, while one of these units is in the stacking step, the other units pertaining to the same row of platforms T can be in operative condition for purposes of buffering the packs P coming from the units D or D'.

Figures 14, 15:
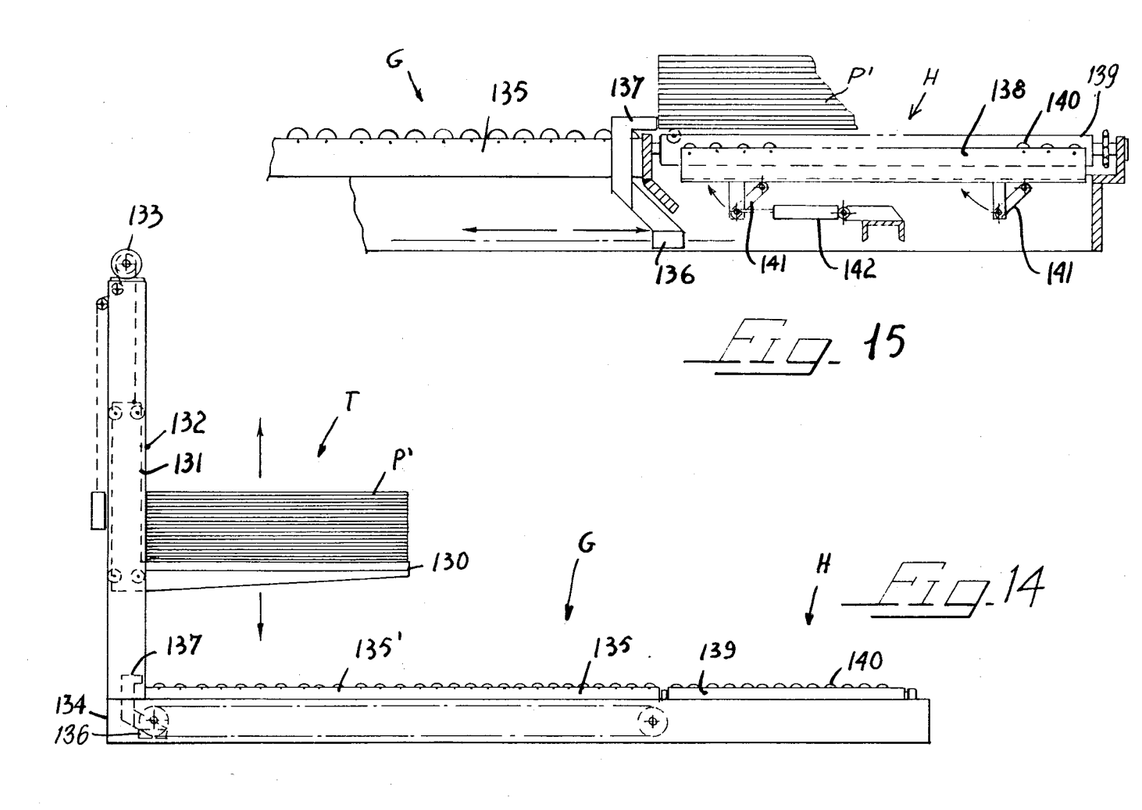
FIG. 14 is a side view of one of the lifting platforms supplied by the units of FIG. 13, together with the components to which the stack of panels will be supplied thereafter.
FIG. 15 is a fragmentary longitudinal sectional view of further constructional details of the assembly of FIG. 14, showing the rearmost portion thereof comprising the powered roller assembly.

With reference to FIG. 14, it will be noted that the movable table 130 of the lifting platforms T is of comblike formation and is supported in cantilever fashion by a carriage 131 sliding within a vertical guide structure 132 and driven by suitable means 133 comprising, for example, a motor-reducer and chains. The bed plate 134 for the platforms T is engaged by extensions 135' of the parallel runways with idle rollers 135 constituting the stations G in front of said platforms T, a transverse bar 136 being longitudinally slidable under said runways and having secured thereto teeth 137 protruding upwards from said runways and normally in a retracted position within the guide structure 132. When a stack of panels P' is to be removed from a lifting platform T, the table 130 of said platform is completely lowered so that due to its comb-like formation it will be interleaved between the runways 135 and will be lowered below said runways which, therefore, will take over the support of said stack P'. At due time, the bar 136 will be actuated and will engage, through its teeth 137, the stack P' making the latter slide along the runways 135', 135. As mentioned above with reference to FIG. 1, the stacks P' may either be accumulated or stored in the stations G, or they may be transferred directly onto the powered roller runways H, H'. In the latter case (FIG. 15), suitable profiles 138—arranged parallely between the rollers 139 of runways H, H', provided at the top with idle rollers 140 and interconnected to form frames which are controlled by links 141 and jacks 142—are raised so that the rollers 140 will be located above the rollers 139 and co-planar with those of the runways G, so as to receive the stack P' therefrom when the latter has been displaced by the teeth 137 of the bar 136. The profiles 138 are then lowered and the stack of panels P' is lowered onto the rollers of the removing runways H or H'.

It is to be understood that the constructional details of the electrical and fluid-operated circuits and of the various safety and programming devices for the automatic operation of the machine have been omitted in the description in that they are obvious and can be constructed readily by those skilled in the art.

I claim:

1. A machine for stacking automatically on respective lifting platforms packs of panels (P) of different sizes coming, for example, from a cutting line of a dividing machine (Z) having a working plane, comprising
   (a) means (A) for removing, from a cutting line of a last said dividing machine, the packs of panels cyclically resulting from each dividing operation and arranged side by side;
   (b) switching station means (B) for simultaneously and selectively feeding the packs of panels, arranged side by side, to a stacking machine (Q), or, after an optional 90° rotation of the packs, to a transport runway (C) where said packs will be arranged either side by side if they have been previously rotated, or in sequence;
   (c) at least one lifting platform (T) arranged in one or more rows at right angles to said transport runway (C) to which said packs of panels are fed after said optional 90° rotation;
   (d) means (D, D') operating transversely of said transport runway (C), in registry with each lifting platform, to stop the packs of panels and to feed said packs of panels, in a single row and properly spaced apart, to receiving means (E, E');
   (e) said receiving means (E, E') operating longitudinally above each row of lifting tables, and adapted to sort and stack softly said packs onto the platforms (T), so that panels of the same size will be stacked at one time on each lifting platform; and
   (f) means (G, H) for removing the stacks of panels formed on the lifting platforms.

2. A machine according to claim 1, wherein the means for cyclically removing from the cutting line the packs of panels formed at each dividing step comprises
   (a) a grid-like frame (1) arranged immediately downstream of the working plane of the dividing machine and co-planar therewith, for receiving the packs resulting from the cutting operation, said plane being defined by beams which are parallel to each other, equally spaced apart, at right angles to the cutting line of said dividing machine and preferably coated with any suitable material on the upwardly-facing portion thereof to avoid marring the panels;
   (b) a second frame (4) located at a suitable distance and parallelly below the grid-line frame (1), and a carriage (12) preferably connected to means imparting variable motion being longitudinally slidable on this lower frame, so that said carriage will begin each stroke with an accelerating motion and will finish the same with a decelerating motion;
   (c) a plurality of teeth (18) mounted on the carriage (12), adapted to swing on a common axis transverse to said carriage; said teeth being located in spaces between the beams (1) forming the grid-like frame and being aligned and disposed with a planar end portion thereof in a co-planar position; means being provided to cause the teeth to be held with their said end portions either below the sliding surface formed by the grid-like frame or properly protruding from said surface;
   (d) a portal-like structure (23) mounted by means of uprights (22) on the said carriage (12) and capable of supporting, in turn, above the grid-like plane, clamping means comprising, for example, pneumatic jacks (24) with a downwardly-directed rod, in line with said teeth (18), and each said rod being provided with a pad (25);
   (e) a retractable paddle (29) mounted on said portal-like structure (23) and located rearwardly of the clamping means formed by said teeth (18) and overlying jacks (24), at a distance from said device which is smaller than the stroke of the carriage, such that, after the removal of a group of packs from the dividing machine by the action of said carriage and said clamping means (24, 25, 18), said paddle is retracted and, after the carriage has moved back to the start position with said paddle in retracted position, the paddle (29) will be lowered and the carriage will be moved again through a complete reciprocation, whereby said group of packs will be further displaced and transferred to other transferring means.

3. A machine according to claim 2, wherein the actuating means for the carriage (12) comprises a motor-reducer (13) secured to said second frame, supporting guides (10) for said carriage, a slow-moving shaft of said motor-reducer having keyed thereto a crank (14) moving in a space formed between said second frame and said grid like frame (1), and connected to said carriage through a connecting rod (15).

4. A machine according to claim 3, wherein an assembly formed by said grid-like frame (1) and said second frame (4) supporting the guides (10) for the carriage (12) carrying said removing means is pivoted transversely at its rear end to a stationary supporting structure (6) supporting servo-controls, such as fluid operated jacks (7), whereby said assembly, if necessary, may be rotated with its front end upwards, so as to form, adjacent said dividing machine, an opening of such a width as to permit the disposal of the cut-offs resulting from the dividing cycle of each pack of panels, means (9) being provided to collect and discharge said cut-offs of material.

5. A machine according to claim 1, wherein the packs of panels removed from the cutting line by said removing means are placed onto a horizontal grid-like plane formed by profiles which are parallel to each other and to said cutting line and have an isosceles trapezoid (35) configuration, said profiles forming spaces between them, and powered belts (38) mounted on a frame and located longitudinally in said spaces between said profiles, such that, when said frame is raised by jacks, the packs of panels will be supported by said belts and will be transferred thereby to the transport runway.

6. A machine according to claim 5, wherein, at said switching station means (B) to which the packs of panels are transferred by the removing means, a transverse paddle member (57) mounted on a carriage (53), said carriage sliding on guides at right angles to the cutting line of the dividing machine, said transverse paddle members capable of moving in the vertical direction and capable of rotating through 90° from a position which is parallel to said cutting line to a position which is at right angles to said cutting line; wherein at the beginning of each cycle said paddle member (57) is parallel to the cutting line and raised from an underlying sliding plane of the packs of panels, and the respective carriage (53) is at one end position near the removing means, such that, if the packs of panels are to be fed to the stacking device (Q), said paddle will be lowered and transferred by its own carriage, and that, if the packs of panels are to be transferred to the transport runway (C) supplying rows of lifting platforms (T), said paddle either remains in its rest position or is lowered and then rotated through 90°, whereafter the powered belts of the underlying composite support structure will lift the packs and transfer them to said transport runway in orderly arrangement either in sequence or side by side depending upon whether said packs have been rotated through 90°.

7. A machine according to claim 6, wherein the paddle member (57) is provided with a stop (58) at its free end, said stop engaging against the outer end of a pack of panels to keep it in an orderly assembly during the 90° rotation.

8. A machine according to claim 6, wherein the carriage (53) carrying the paddle member (57) moves on a pair of parallel guides (50), said parallel guides being pivoted at the upper portion of a frame (47) of the stacking device (Q), said guides being connected to jacks (51) which indirectly effect the raising and lowering of said paddle.

9. A machine according to claim 8, wherein the stacking device comprises a wedge (67) arranged in a lifting platform (48), whereon a plurality of packs of panels can be stacked side by side simultaneoudly, said wedge slides on a pair of guides (64) which are pivoted at one end thereof to an upper portion of the frame of said stacking device and the pivoting movement of said guides is controlled by jacks (65) to establish the positioning of said wedge (67), said guides being directed in the same direction as the packs of panels coming to said wedge and leaving from the lifting platform.

10. A machine according to claim 1, wherein the transport runway (C) to which the packs of panels are transferred after the optional 90° rotation comprises a plurality of grid-like beds (73) arranged in sequence and provided with longitudinal powered belts (75) which may be lowered and raised, such that upon lowering the belts of the bed whereon the packs of panels to be transferred to a row of platforms are stopped, the belts of the bed or beds upstream thereof may continue operating for buffer storing further packs of panels coming from the station effecting the 90° rotation.

11. A machine according to claim 10, comprising a transverse partition (83) in registry with each row of lifting platforms, on said transport runway (C), said transverse partition (83) being connected to means for displacing it vertically, whereby it can be lowered to stop the packs of panels transported on said runway; transfer means (D, D') being provided whereby upon such occurrence the front end of each pack of panels is raised from the underlying support plane and is clamped between a powered roller assembly (87, 87') and a upper idle and spring-loaded roller assembly (93), said roller assembly having axes parallel to each other and to the longitudinal axis of said transport runway, in such manner that the packs of panels can be fed in sequence to the sorting and stacking means (E) located above the adjacent row of lifting tables.

12. A machine according to claim 11, wherein the lower roller assembly (87, 87') is driven by means adapted to ensure a soft start of the packs of panels.

13. A machine according to claim 12, wherein the lower roller assembly (87, 87') comprises two discrete groups of rollers arranged in sequence, provided with respective drive means and with respective vertical displacement means, such that by cyclically deactivating the first group of rollers (87) the packs of panels fed to the sorting and stacking means (E) operating above each row of lifting platforms can be spaced from each other.

14. A machine according to any one of claims 11 to 13, wherein said roller assemblies are supported by a plurality of structures (88, 88') selectively movable up and down, such that, if the packs of panels are arranged sequentially on said runway, as a result of said up and down movement said packs can be clamped one by one by said roller assemblies and spaced apart from the succeeding packs to avoid rubbing therewith while being transferred to the sorting and stacking means (E, E') operating above the adjacent row of lifting platforms.

15. A machine according to claim 13, wherein the sorting and stacking means (E, E'), operating above each row of lifting platforms (T) and receiving the packs of panels coming in a single row from the transfer means (D, D'), comprises a lower powered roller assembly (109) and an upper idle and spring-loaded assembly (105), aligned with the roller assemblies of the transfer means (D, D') and therefore capable of operating on one end of each pack of panels, and further comprises an lower idle roller assembly (114) supporting said packs at the bottom thereof at the other end and mounted on a powered carriage (117) for changing the positioning of said lower idle roller assembly (114) as a function of the size of the packs of panels; said lower roller assemblies being mounted on powered movable structures so as to be selectively withdrawn from the pack which will be left supported by teeth of comb-like structures (121, 122), one of which is associated with said carriage and which are driven in such a manner that, upon activation, they will be progressively withdrawn from the pack and the latter will be placed softly either on the lifting platform or on the top of the stack of panels which has been formed on said platform, means being provided to cause, upon laying a pack of panels on the lifting platform, the latter to be lowered, and to cause the roller assemblies and the teeth of the combs to be moved back to their original position, to enable a new working cycle to be repeated.

16. A machine according to claim 15, wherein the packs of panels reaching the sorting and stacking means (E, E') operating longitudinally above each row of lifting platforms are guided laterally by grid-like structures (127, 128) one of which is associated with the carriage (117) displacing as a function of the size of the packs, said grid-like structures being adapted to continue cooperating with the pack of panels even when the latter is stacked on an underlying platform, thereby maintaining the orderly assembly of said pack.

17. A machine according to claim 16, wherein each lifting table is provided with sorting and stacking means (E, E') which can be actuated selectively, such that, while one of said units discharges a pack of panels, the unit or units adjacent thereto may continue operating to form a buffer storage of further packs of panels.

18. A machine according to claim 17, comprising a transverse partition (129) in registry with each lifting platform and connected to means by which it can be displaced vertically, whereby it can be lowered to stop the pack of panels which is to be stacked cyclically on the platform, and is preferably held in its lowered position even while said pack is being stacked, thus maintaining the orderly assembly of said pack.

19. A machine according to claim 1, wherein the lifting platforms (T) which are aligned with each other each have a movable table (130) of comb-like formation and supported in cantilever fashion by a vertical guide structure (132), such that, when a stack of panels formed on a platform is to be removed therefrom, said table is lowered completely and is interleaved between the hollow spaces existing between parallel runways (135, 135') of idle wheels, which will take over in supporting the stack; and wherein a comb-like pusher (137) will be activated in due time and will act against the rear lower portion of the stack to push it out of the plan view outline of the lifting table, whereafter the latter may be lifted again to repeat its working cycle.

20. A machine accorcding to claim 19, wherein the parallel runways (135, 135') of idle wheels extending from each row of lifting platforms reach a powered roller assembly (H, H') provided with transverse slifing runways (138, 140) adapted to be moved vertically, such that raising the latter runways enables introduction of the stacks of panels onto the roller assembly (H, H') which will take over in supporting and controlling said stack as soon as said movable runways are lowered.

* * * * *